No. 824,892. PATENTED JULY 3, 1906.
J. C. WANDS.
WHEEL.
APPLICATION FILED DEC. 26, 1905.
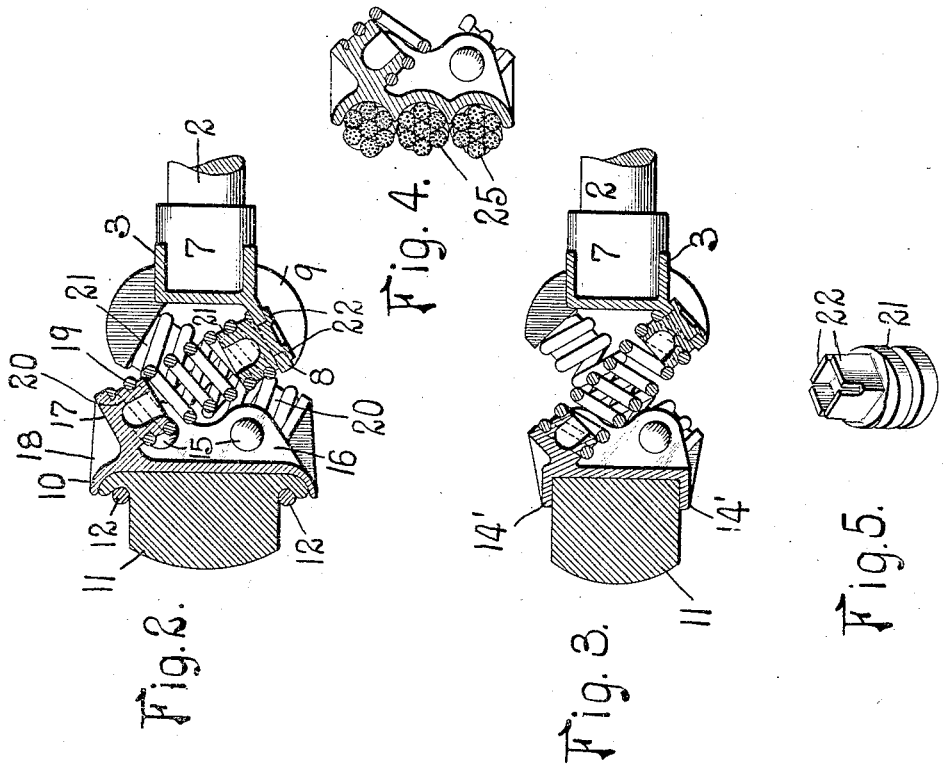
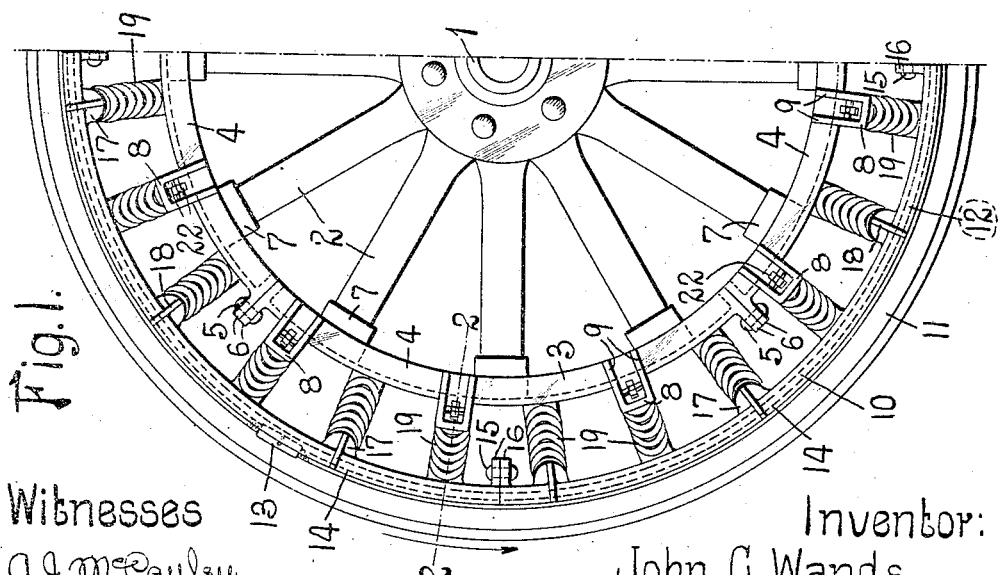
Witnesses
A. J. McCauley
Wells L. Church
Inventor:
John C. Wands
by Bakewell Cornwall
Atty's

UNITED STATES PATENT OFFICE.

JOHN C. WANDS, OF ST. LOUIS, MISSOURI.

WHEEL.

No. 824,892.   Specification of Letters Patent.   Patented July 3, 1906.

Application filed December 26, 1905. Serial No. 293,283.

*To all whom it may concern:*

Be it known that I, JOHN C. WANDS, a citizen of the United States, residing at St. Louis, Missouri, have invented a certain new and useful Improvement in Wheels, of which the following is a full, clear, and exact description, such as will enable others skilled in the art to which it appertains to make and use the same, reference being had to the accompanying drawings, forming part of this specification, in which—

Figure 1 is a side elevation of a portion of a wheel embodying the features of my invention. Fig. 2 is a sectional view on the line 2 2 of Fig. 1. Fig. 3 is a view similar to Fig. 2 of a modified form of my invention. Fig. 4 is a detail sectional view of still another form of my invention, and Fig. 5 is a detail perspective view of one of the devices which are used for connecting the springs to the inner rim.

This invention relates to wheels for vehicles, and particularly to resilient wheels such as are used on automobiles in place of rigid wheels provided with pneumatic tires.

The object of my invention is to provide a wheel of simple construction which will relieve the vehicle from jolting or jarring as it passes over obstructions or irregularities in the road.

Other objects and advantages of my invention will hereinafter be pointed out.

Referring to the drawings, which represent the preferred form of my invention, 1 designates a hub, provided with spokes 2, which are connected to the inner rim 3. Said inner rim is made up of a plurality of channel-shaped sections 4, preferably four in number, which are connected by rivets 5, projecting through coöperating-lugs 6 at the opposite ends of each section. Tubular-shaped bosses 7 project inwardly from said rim to receive the spokes, and on each side of said rim are a plurality of projecting lips 8, which are utilized for a purpose hereinafter described, said lips being strengthened by gussets 9, formed integral with the rim. Surrounding the inner rim is a felly-rim 10, which is of greater diameter and of approximately channel shape, to constitute a seat for the tread 11 of the wheel, which, in the preferred form of my invention consists of thick rubber, that is held on the felly-rim by strands of wire 12, as shown in Figs. 1 and 2, the ends of said strands being connected by turnbuckles 13. The felly-rim is also made up of a number of sections 14, which are connected by rivets 15, extending through coöperating lugs 16, formed on said sections, the sections which comprise the felly-rim being arranged in staggered relation relatively to the sections which comprise the inner rim, as shown in Fig. 1, thereby greatly strengthening the wheel. Projecting lips 17, strengthened by gussets 18, are formed integral with the felly-rim, and each lip carries a device for securing one end of a coiled spring 19, which at its other end is secured to one of the coöperating lips 8 on the opposite side of the inner rim. As shown in the drawings, the springs are arranged alternately in opposite directions, so that the felly rim is held in perfect alinement with the inner rim; but a slight lateral movement of the felly-rim in either direction is permitted.

The means for attaching the springs to the felly-rim consist of threaded projections 20, formed integral with the lips 17, so that when said springs are screwed onto said projections they will be held securely in position. The opposite ends of the springs are secured to the inner rim by devices which have a screw-threaded portion 21 to receive the spring, and a portion having tongues 22, which project through an opening in the lip 8 on the inner rim, the tongues on said portion being bent down upon the outer face of said lip to hold the device securely in position, as shown in Figs. 2 and 3.

With a construction of this character it is very easy to assemble the parts comprising the wheel, so that the cost of manufacture is greatly reduced. Furthermore, if one of the springs should become damaged it is very easy to substitute a new one by taking a punch or other suitable instrument and removing the device which secures the spring to the inner rim, the old spring being unscrewed from the projection on the felly-rim and a new spring put in place and secured in position, as previously described.

In Fig. 3 I have shown a slightly-modified form of felly-rim that is of channel shape, so that the legs 14' of the channel will embrace the side faces of the rubber-tread 11, and in Fig. 4 I have shown still another form of felly-rim, which is somewhat similar to that shown in section in Fig. 2, but which is provided with corrugations to receive strands of rope 25, that form the tread of the wheel. It is obvious that a wheel constructed in this manner will relieve a vehicle from any strains due to jolting or jarring, for when the wheel passes over an obstruction or irregularity in the road the springs at the lower part of the wheel and also a portion of those at the front of the wheel will be under compression, while the remainder of the springs will be under tension. As previously pointed out, a slight lateral movement of the outer rim is permitted; but the springs are so disposed as to hold the felly-rim normally in perfect alinement with the inner rim.

Having thus described my invention, what I claim as new, and desire to secure by Letters Patent, is—

1. A wheel comprising a hub, spokes and an inner rim connected to said spokes, a felly-rim of approximately channel shape to receive a tread, coöperating lips carried by said rims, coiled springs arranged alternately in opposite directions and connected at one end to screw-threaded projections formed integral with the lips of the felly-rim, and devices coöperating with said projections and provided with screw-threaded portions to receive the opposite ends of said springs, said devices being adapted to be removably connected to the lips on the inner rim; substantially as described.

2. A wheel comprising a hub, spokes and an inner rim made up of a number of sections provided with tubular bosses to receive said spokes, a felly-rim made up of a number of sections arranged in staggered relation relatively to the sections of the inner rim, coiled springs arranged alternately in opposite directions and connected at one end to the felly-rim, devices carried by the inner rim and provided with screw-threaded portions for receiving the opposite ends of said springs to hold them in position, and tongues on said devices which are adapted to be bent down upon the inner rim to secure said devices to the inner rim; substantially as described.

3. A wheel comprising a hub, spokes and an inner rim made up of a plurality of channel-shaped sections, a felly-rim made up of a number of sections which are arranged in staggered relation relatively to the sections of the inner rim, and coiled springs arranged alternately in opposite directions and connected at their opposite ends to the inner rim and felly-rim; substantially as described.

In testimony whereof I hereunto affix my signature, in the presence of two witnesses, this 21st day of December, 1905.

JOHN C. WANDS.

Witnesses:
WELLS L. CHURCH,
GEORGE BAKEWELL